US011550664B2

(12) United States Patent
Luong et al.

(10) Patent No.: US 11,550,664 B2
(45) Date of Patent: Jan. 10, 2023

(54) EARLY BOOT EVENT LOGGING SYSTEM (71) Applicant: Dell Products L.P., Round Rock, TX (US)

(72) Inventors: Anh Dinh Luong, Austin, TX (US); Po-Yu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 337 days.

(21) Appl. No.: 16/378,023

(22) Filed: Apr. 8, 2019

(65) Prior Publication Data
US 2020/0319975 A1 Oct. 8, 2020

(51) Int. Cl.
*G06F 11/14* (2006.01)
*G06F 9/4401* (2018.01)
*G06F 11/07* (2006.01)
*G06F 11/34* (2006.01)

(52) U.S. Cl.
CPC ........ *G06F 11/1417* (2013.01); *G06F 9/4401* (2013.01); *G06F 11/0748* (2013.01); *G06F 11/3476* (2013.01)

(58) Field of Classification Search
CPC ............. G06F 11/0748; G06F 11/3476; G06F 11/1417; G06F 9/4401
See application file for complete search history.

(56) References Cited

U.S. PATENT DOCUMENTS

| 2003/0070115 | A1* | 4/2003 | Nguyen | G06F 11/0787 714/23 |
| 2004/0098575 | A1* | 5/2004 | Datta | G06F 12/126 711/E12.075 |
| 2004/0193808 | A1 | 9/2004 | Spencer | |
| 2005/0060526 | A1* | 3/2005 | Rothman | G06F 11/0787 713/1 |
| 2006/0062046 | A1* | 3/2006 | Babudri | G06F 11/1417 365/185.09 |
| 2007/0192578 | A1* | 8/2007 | Duron | G06F 9/4401 713/1 |
| 2007/0277027 | A1* | 11/2007 | Kim | G06F 9/4401 713/1 |
| 2014/0237223 | A1* | 8/2014 | Chudgar | G06F 9/4416 713/2 |
| 2016/0063255 | A1* | 3/2016 | Jeansonne | G06F 21/572 713/2 |

(Continued)

*Primary Examiner* — Phil K Nguyen
*Assistant Examiner* — Gayathri Sampath
(74) *Attorney, Agent, or Firm* — Joseph Mencher (57) ABSTRACT

An early boot debug system includes a first memory subsystem that includes boot instructions and a processing system that is coupled to the first memory subsystem. The processing system includes a primary processing subsystem, and a secondary processing subsystem that is coupled to the primary processing subsystem and a second memory subsystem. The secondary processing subsystem copies the boot instructions from the first memory subsystem to the second memory subsystem and executes the boot instructions from the second memory subsystem during a boot operation. The secondary processing subsystem then detects a first event during the execution of the boot instructions and, in response, generates a first event information. The secondary processing subsystem stores the first event information in the second memory subsystem to be retrieved on-demand by an administrator.

17 Claims, 8 Drawing Sheets

(56) References Cited

U.S. PATENT DOCUMENTS

| | | | |
|---|---|---|---|
| 2016/0155476 A1* | 6/2016 | Fang | G07C 5/0891 |
| | | | 348/231.1 |
| 2017/0078169 A1* | 3/2017 | Bent | H04L 43/02 |
| 2017/0168849 A1* | 6/2017 | He | G06F 9/4401 |
| 2018/0074884 A1* | 3/2018 | Cady | G06F 11/0787 |
| 2018/0144136 A1* | 5/2018 | Nadarajah | G06F 21/575 |
| 2020/0192779 A1* | 6/2020 | Minja | G06F 11/3034 |

* cited by examiner

EARLY BOOT EVENT LOGGING SYSTEM

BACKGROUND

The present disclosure relates generally to information handling systems, and more particularly to logging early boot event in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, include boot systems that operate to perform the boot operations that initialize the server device. For example, the boot system in some server devices utilizes a Central Processing Unit (CPU), a Serial Peripheral Interface (SPI) flash memory that is coupled to the CPU via a SPI interface and that stores firmware volumes that may be utilized to provide a Basic Input Output System (BIOS), and a host memory that is coupled to the CPU via a host memory interface. Such boot systems typically perform early boot operations that include the CPU retrieving the firmware volumes from the SPI flash memory via the SPI interface, providing those firmware volumes on the host memory via the host memory interface, and utilizing those firmware volumes to provide a BIOS that is configured to complete the boot operations and initialize the server device so that the server device may enter a runtime state.

Often, prior to the BIOS being provided, the CPU uses a secondary processing system such as, for example, a Secure Processor™ (e.g., a Platform Security Processor™ (PSP)) available from AMD®, a Management Engine™ (ME) manufactured by Intel® Corp. of Santa Clara, Calif., and/or other secure processing systems known in the art to perform the early boot operations before the BIOS is provided by a primary processing system that is configured with the x86 architecture to complete the boot process. These early boot operations include training and initializing memory, identifying and initializing inter-socket links, and/or other security functionality known in the art. Many of the early boot operations may result in events that are performed by the secondary processing system and that may include errors, milestones, and/or other status/event information that may be useful to an administrator. However, it is difficult to capture and/or communicate to an administrator those early boot events that occur during the early boot operations because a very limited number of the server device's resources are available to store and communicate those events.

Accordingly, it would be desirable to provide an early boot event logging system.

SUMMARY

According to one embodiment, an Information Handling System (IHS) includes a host memory subsystem; and a processing system that is coupled to the host memory subsystem and that is configured to: copy boot instructions that are stored in a first memory subsystem to a second memory subsystem that is coupled to the processing system; execute the boot instructions from the second memory subsystem; detect a first event during the execution of the boot instructions and, in response, generate first event information; and store the first event information in the second memory subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
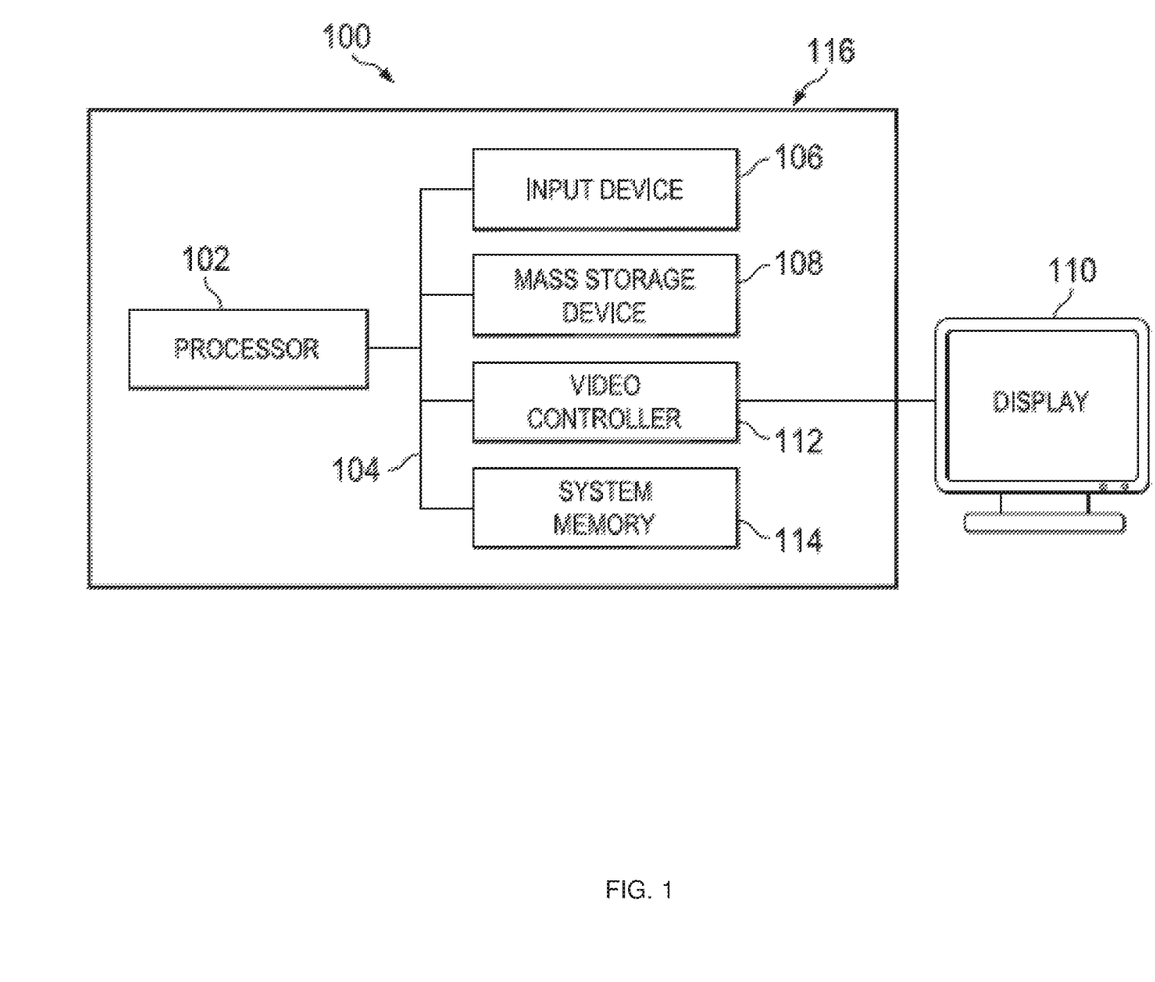
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
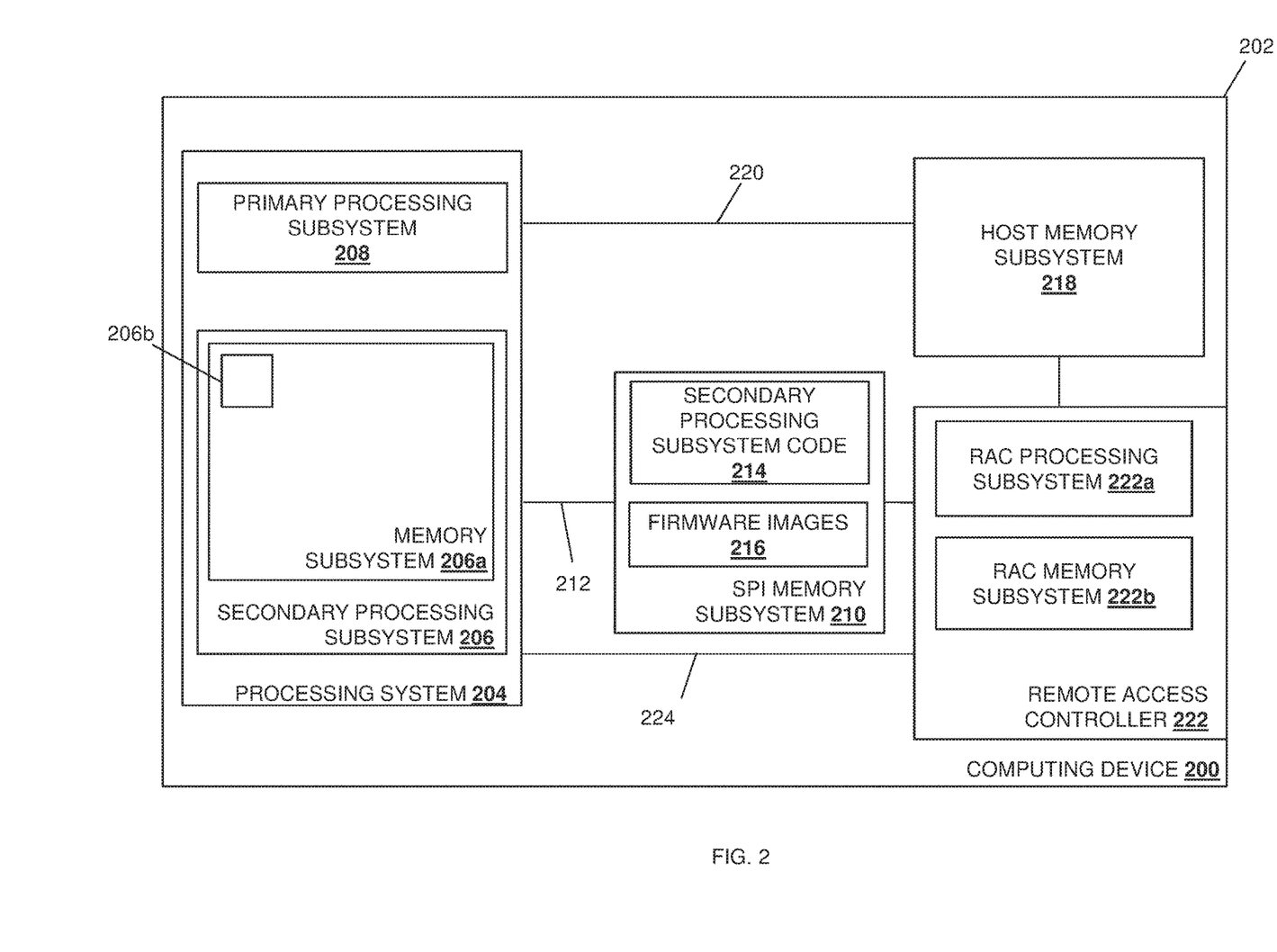
FIG. 2 is a schematic view illustrating an embodiment of a computing device that includes the early boot event logging system of the present disclosure.

Referring now to FIG. 2, an embodiment of a computing device 200 is illustrated that includes the early boot event logging system of the present disclosure, and that may be provided by the IHS 100 discussed above with reference to FIG. 1 and/or may include some or all of the components of the IHS 100. Furthermore, while illustrated and discussed as a server device in some of the embodiments below, one of skill in the art in possession of the present disclosure will recognize that the functionality of the computing device 200 discussed below may be provided by networking devices, desktop computing devices, laptop/notebook computing devices, tablet computing devices, mobile phones, and/or other computing devices that are configured to operate similarly as discussed below. In the illustrated embodiment, the computing device 200 includes a chassis 202 that houses the components of the computing device 200, only some of which are illustrated below. For example, the chassis 202 may house a processing system 204 and a memory system (e.g., that includes the memory subsystems discussed below) that is coupled to the processing system and that includes instructions that, when executed by the processing system 204, cause the processing system to perform the functionality of the processing systems and/or computing devices discussed below.

In some examples, the processing system 204 may be a processing system included in a system on chip (SoC) such as, for example, the NAPLES™ SoC manufactured by Advanced Micro Devices, Inc (AMD) of Santa Clara, Calif. However, one of skill in the art in possession of the present disclosure would recognize that the processing system 204 may be provided on other SoCs, and/or may include distinct systems that are coupled together by a communication bus, while remaining within the scope of the present disclosure. The processing system 204 may also include a secondary processing subsystem 206 that is provided by a secure processor that is segregated, distinct from, and/or otherwise separate from the processor 102 (e.g., a CPU) in the IHS 100, discussed above with referent to FIG. 1. In a specific example, the secondary processing subsystem 206 may be a Platform Security Processor (PSP) available from AMD® of Santa Clara, Calif., United States. The secondary processing subsystem 206 may include a memory subsystem 206a that may be provided, in a specific example, by a PSP Random Access Memory (RAM). As illustrated, the memory subsystem 206a may include an event memory block 206b that may be dedicated for storing event information, and may be a portion of the memory subsystem (e.g., a 64 KB or smaller block of memory). As would be understood by one of skill in the art in possession of the present disclosure, the secondary processing subsystem 206 may provide a trusted execution environment that operates to create, monitor, and maintain a security environment in the processing system 204/computing device 200 by managing a boot process for the computing device 200, initializing security-related mechanisms in the computing device 200, monitoring the computing device 200 for suspicious activities or events and implementing appropriate responses, initializing and training host memory, and/or performing other PSP functionality that would be apparent to one of skill in the art in possession of the present disclosure.

The secondary processing subsystem 206 may also include a plurality of components such as, for example, a dedicated microcontroller (e.g., an ARM® architecture based 32-bit microcontroller), an isolated on-chip ROM, interfaces to various memory systems (discussed below), hardware logic for providing for secure control of the initialization of a primary processing system, a cryptographic co-processor (which may include, for example, a random number generator (RNG), several engines to process standard cryptographic algorithms (AES, RSA, SHA, and other algorithms that would be apparent to one of skill in the art in possession of the present disclosure), a key storage block, and/or other cryptographic components/applications), an interface for accessing a video controller, a one-time pad (OTP) for platform unique key material, and/or any other components that would be apparent to one of skill in the art in possession of the present disclosure. However, while discussed below as a PSP subsystem, in other examples the secondary processing subsystem 206 may be provided by the updated AMD® Secure Processor (AMD-SP), the INTEL® management engine (ME) available from INTEL® corporation of Santa Clara, Calif., United States, and/or other secure/boot processing subsystems that perform operation that occur prior to the execution of primary boot instructions by a BIOS provided via a primary processing subsystem 208, and that would be apparent to one of skill in the art in possession of the present disclosure.

In the illustrated embodiment, the processing system 204 also includes the primary processing subsystem 208. For example, the primary processing subsystem 208 may be configured according to the x86 architecture, which one of skill in the art in possession of the present disclosure will recognize may be provided by an instruction set architecture in the processing system 204 that is based on the INTEL® 8086 microprocessor and its 8088 variant (with additions and extensions that have been added in the decades since those microprocessors were introduced.) However, while a specific processing system 204 is illustrated and described, one of skill in the art in possession of the present disclosure will recognize that a variety of different processing systems having different components and/or component configurations may provide the early boot event logging functionality of the present disclosure while remaining within its scope as well.

In the illustrated embodiment, the memory system in the computing device 200 includes a Serial Peripheral Interface (SPI) memory subsystem 210 that may be provided by, for example, an SPI flash memory device. The SPI memory subsystem 210 is coupled to the processing system 204 by an SPI interface 212. For example, the SPI interface 212 may be provided by an SPI Bus that connects the SPI flash memory device to the processing system 204. One of skill in the art in possession of the present disclosure will recognize that SPI flash memory devices are relatively small, lower-power flash memory devices that provide serial access to data stored thereon, and rather than addressing individual bytes, the processing system 204 may read or write contiguous groups of bytes in the address space of the SPI flash memory device serially, with the SPI Bus providing the typical protocol for access the SPI flash memory device. In the examples illustrated and described below, the SPI memory subsystem 210 stores secondary processing subsystem code 214 (e.g., PSP code), also referred to herein as early boot instructions, which may provide instructions for the secondary processing subsystem 206 to perform the functionality discussed below.

In the illustrated embodiment, the SRI memory subsystem 210 also stores a plurality of firmware images 216. As discussed below, the firmware images 216 include instructions that are configured to be executed by the primary processing subsystem 208 in order to provide a Basic Input Output System (BIOS). One of skill in the art in possession of the present disclosure will recognize that the BIOS provided by the instructions included in the firmware images 216 may be provided via non-volatile firmware that is configured to perform hardware initialization during a booting process for the computing device 200, as well as provide runtime services for an operating system and/or other programs provided on the computing device 200. As would be understood by one of skill in the art in possession of the present disclosure, the BIOS may be provided as a Unified Extensible Firmware Interface (UEFI) BIOS. Thus, while UEFI is known in the art as a specification that has been provided to replace the conventional BIOS, and that defines a software interface between an operating system and platform firmware provided on computing devices, one of skill in the art in possession of the present disclosure will recognize that the discussions of the BIOS below apply to a UEFI BIOS as well.

In the illustrated embodiment, the memory system in the computing device 200 also includes a host memory subsystem 218 that may be provided by, for example, Dynamic Random Access Memory (DRAM) devices and/or other memory devices that would be apparent to one of skill in the art in possession of the present disclosure. The host memory subsystem 218 is coupled to the processing system 204 via a host memory interface 220. In some embodiments, the host memory subsystem 218 may be a memory subsystem that is trained and initialized by the secondary processing subsystem 206 before the primary processing subsystem 208 takes control of the boot operation.

The chassis 202 may also house a remote access controller (RAC) 222 such as, for example, an integrated DELL® Remote Access Controller (IDRAC) available from DELL® Inc. of Round Rock, Tex., United States, other Baseboard Management Controllers (BMCs) known in the art, other server devices (e.g., web servers), and/or other out-of-band controller devices that would be apparent to one of skill in the art in possession of the present disclosure. While illustrated as included in the computing device 200, one of skill in the art in possession of the present disclosure will recognize that the remote access controller 222 may be located outside of the computing device 200 and coupled to that computing device 200 (e.g., located in a server rack and coupled to a server device in that server rack) while remaining within the scope of the present disclosure as well. In the illustrated embodiment, a RAC processing subsystem 222a and a RAC memory subsystem 222b operate, at least in part, to provide the remote access controller 222 that is coupled to at least the processing system 204 via a RAC interface 224, although as illustrated in FIG. 2 may also be coupled to the SRI memory subsystem 210 and the host memory subsystem 218. In some embodiments, the remote access controller 222 may also include a network interface to provide an out-of-band network connection with a management device. In some embodiments, the remote access controller 222 may utilize one or more buses (e.g., the RAC interface 224) to access one or more portions of computing device 200. For example, the remote access controller may include and/or may provide power management, virtual media access, remote console capabilities, as well as other remote access controller functionality that may be available to a user via a web browser and/or a command line interface. As such, the remote access controller may provide and/or provide an administrator (e.g., the user) the ability to configure and/or maintain the computing device 200 as if the administrator was at a console of the computing device 200 and/or had physical access to the computing device 200. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
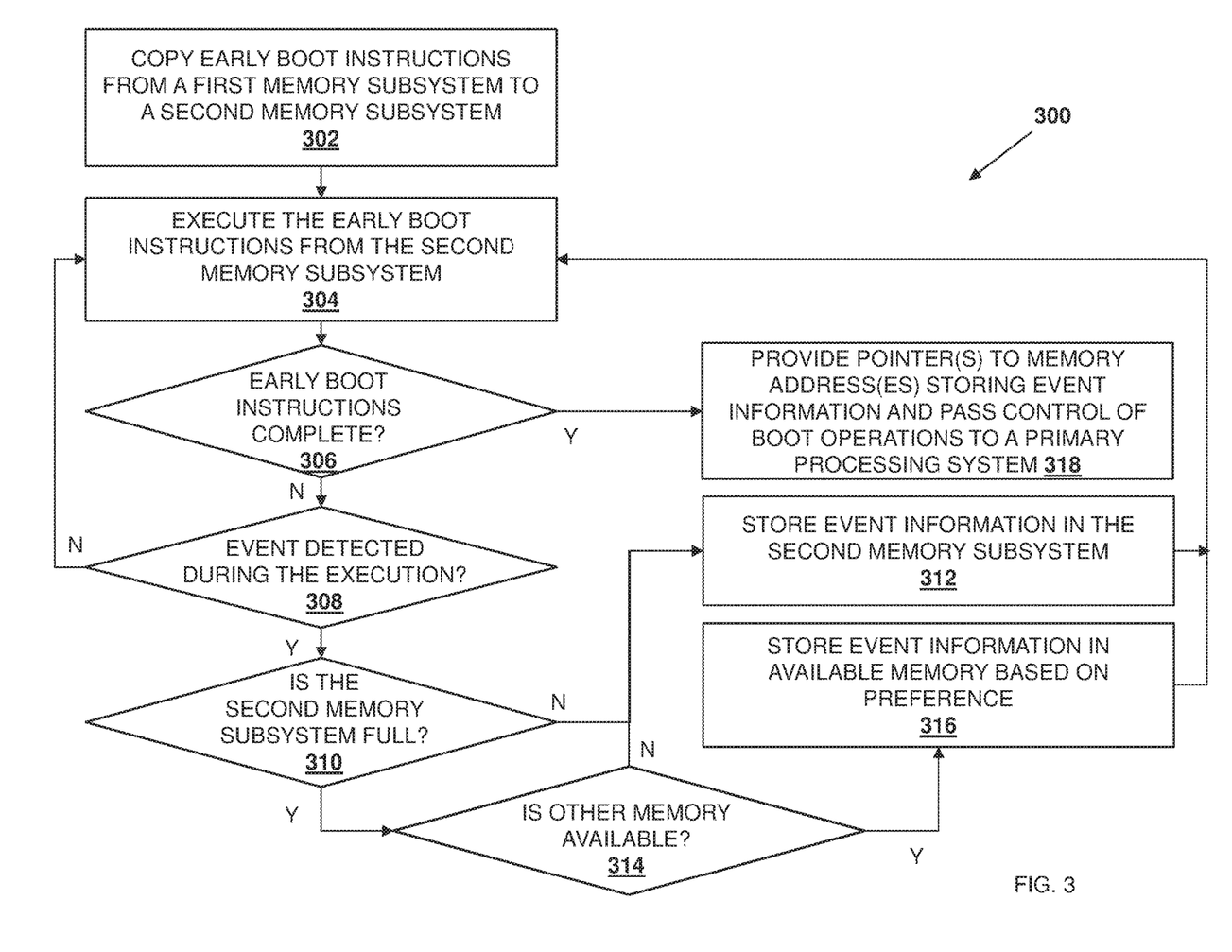
FIG. 3 is a flow chart illustrating an embodiment of a method for event logging early boot operations.

Referring now to FIG. 3, an embodiment of a method 300 for logging events during early boot operations in a computing device is illustrated. As discussed above, during a boot operation of a computing device, a secondary processing system may perform various early boot operations before the boot operation is handed off to a primary processing system and the BIOS, and many errors and other events may occur while the secondary processing system is performing the early boot operations. In conventional boot systems, an option to stream serial messages may be enabled during early boot operations, but the streaming of serial messages increases the time needed to complete boot operations (e.g., by approximately four to sixteen minutes in many conventional systems). This time to boot may be decreased by turning on a memory reference code (MRC) serial debug setup option in a setup menu, but the MRC serial debug setup option has some issues. For example, if the computing device cannot boot to the setup menu to enable the MRC serial debug setup option, which is available after the primary processing system takes control of the boot operation, the MRC serial debug setup option cannot be enabled. In addition, if the issue causing the errors is intermittent, it is difficult to determine when the MRC serial debug setup option needs to be enabled.

As discussed below, the systems and methods of the present disclosure provide for event logging during early boot operations of the computing device via the operations of a secondary processing system that may save event information to a portion of a memory subsystem associated with the secondary processing system (e.g., a PSP RAM) during every boot. When the portion of the memory subsystem associated with the secondary processing system is full, the secondary processing system may store additional event information in another memory subsystem based on, for example, preferences and memory subsystem availability. For example, the secondary processing system may store the event information in an SRI memory subsystem, a remote access controller memory subsystem, and/or a host memory subsystem. In the event that no memory subsystems are available other than the memory subsystem associated with the secondary processing system, or the memory subsystem associated with the secondary processing system is provided as the preferred memory subsystem (e.g., relative to the rest of the available memory subsystems), then the secondary processing system will overwrite the event information stored in the memory subsystem associated with the secondary processing system with the most current event information. When the boot instructions performed by the secondary processing system are complete, the secondary processing system may pass control of boot operations to the primary processing system and provide a pointer to each memory address in which the event information is stored. As such, the event information may be accessed and viewed by an administrator on-demand, rather than streaming serialized messages that contain event information on-demand (e.g., when the option to stream serialized messages is enabled). Thus, the systems and methods of the present disclosure reduce boot time, permit access to the event information generated early in the boot process, and may be used to more easily detect intermittent events that occur early in the boot process.

Figure 4A:
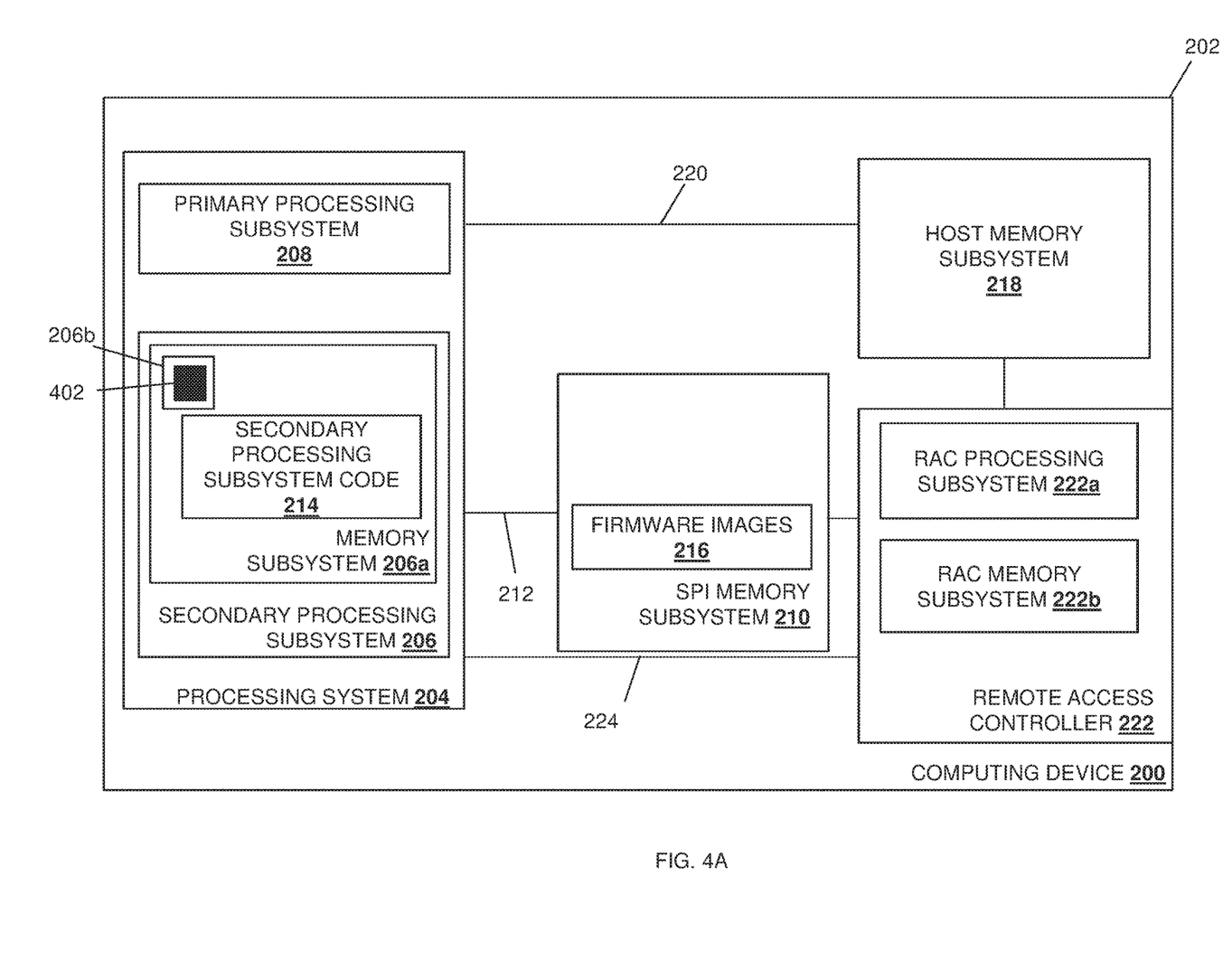
FIG. 4A is a schematic view illustrating an embodiment of the operations of the early boot event logging system in the computing device of FIG. 2 during the method of FIG. 3.

The method 300 begins at block 302 where early boot instructions are copied from a first memory subsystem to a second memory subsystem. In an embodiment, at or prior to block 302, the computing device 200 may be powered on, started up, reset, re-booted, and/or otherwise initialized in order to begin boot operations for the computing device 200. In an embodiment, when boot operations begin, the SRI memory subsystem 210 may be powered on, and an SRI interface performance level of the SRI interface 212 may be set. As such, at block 302, initialized portions of the processing system 204 (e.g., the secondary processing subsystem 206) operates to retrieve the secondary processing subsystem code 214 (e.g., PSP code) from the SRI memory subsystem 210 via the SRI interface 212 at the SRI interface performance level, and provides that secondary processing subsystem code 214 in the memory subsystem 206a (e.g., a PSP RAM), as illustrated in FIG. 4A. As discussed herein, the secondary processing subsystem code 214 may include early boot instructions that provide a portion of the boot instructions that enable the boot operations for the computing device 200.

As would be understood by one of skill in the art in possession of the present disclosure, the provisioning of the secondary processing subsystem code 214 in the memory subsystem 206a allows the secondary processing subsystem 206 to utilize the secondary processing subsystem code 214 in order to perform the secondary processing subsystem functionality discussed below. Furthermore, in addition to performing the operations discussed below, the secondary processing subsystem 206 may perform computing device configuration operations such as, for example, discovering the host memory subsystem 218, configuring a communications fabric for the computing device 200, and/or performing a variety of other PSP subsystem operations that would be apparent to one of skill in the art in possession of the present disclosure.

The method 300 then proceeds to block 304 where the early boot instructions are executed from the second memory subsystem. In an embodiment, at block 304, the secondary processing subsystem 206 may execute the secondary processing subsystem code 214 to perform memory and data initialization, load and execute the firmware images 216 (e.g., firmware for a trusted platform module (TPM)), perform validation of primary boot instructions used by the primary processing subsystem 208 to complete the boot operations, establish a side-band signal between the processing system 204 and the remote access controller 222 via the RAC interface 224, discover and initialize the host memory subsystem 218, create a result of the configuration process to an output buffer in host memory subsystem 218, and/or perform any other early boot operations that would be apparent to one of skill in the art in possession of the present disclosure. As will be appreciated by one of skill in the art in possession of the present disclosure, the secondary processing subsystem 206 may continue to execute the secondary processing subsystem code 214 until the primary processing subsystem 208 is initialized which, in some embodiments, may occur after the primary boot instructions have been validated by the secondary processing subsystem 206 and control of the boot operations has been handed off to the primary processing subsystem 208.

The method then proceeds to decision block 306 where it is determined whether the execution of early boot instructions has completed. In an embodiment, at decision block 306, the processing system 204 may determine whether the secondary processing subsystem code 214 has been fully executed such that the primary processing system 208 has been initialized and has been provided control of the boot operations. However, while a specific example of the completion of the execution of early boot instructions has been provided, one of skill in the art in possession of the present disclosure will recognize that the execution of early boot instructions may be determined to have been completed based on a variety of factors that will fall within the scope of the present disclosure as well.

If, at decision block 306, it is determined that the early boot instructions have not completed, the method 300 proceeds to decision block 308 where it is determined whether an event has occurred during the execution of the early boot instructions. In an embodiment of decision block 308, during the execution of the secondary processing subsystem code 214 by the secondary processing subsystem 206 and prior to handing off the boot operations to the primary processing subsystem 208, the secondary processing subsystem 206 may detect an event. For example, the event detected at decision block 308 may include milestones, statuses, or other occurrences that result from the execution of the secondary processing subsystem code 214 such as, for example, that a data fabric initialization is completed, that memory discovery is running, that memory discovery is completed, a variety of security events, and/or other milestones that would be apparent to one of skill in the art in possession of the present disclosure. Similarly, the event may include an error that occurs when executing the secondary processing subsystem code 214. For example, the secondary processing system 206 may detect a memory error such as, for example, a memory not found error, that a memory subsystem trained at lower speed than it advertised, that a memory subsystem is present but cannot be trained, a variety of data fabric initialization errors, a variety of interconnect initialization errors, and/or any other error that would be apparent to one of skill in the art in possession of the present disclosure. In an embodiment, each event detected at block 308 may result in the secondary processing subsystem 206 generating event information that describes that event. For example, if a critical error (e.g., no memory found, corruption of binary images, etc.) occurs, the boot process may halt and a POST code will be generated. In another example, if a non-critical error (e.g., inter-connect links fail, some memory fails to train, etc.) occurs the computing system 200 will continue to try to boot and errors are logged in a data structure that can be parsed by other components besides the secondary processing subsystem 206 such as the primary processing subsystem 208.

If, at decision block 308, it is determined that an event has not been detected, the method 300 returns back to block 304 where subsequent early boot instructions are executed. As such, the method 300 may loop through blocks 304, 306, and 308 to execute early boot instructions and detect events during that execution as long as the execution of the early boot instructions has not been completed. However, if at decision block 308 an event is detected and event information is generated as discussed above, the method 300 proceeds to decision block 310 where it is determined whether the second memory subsystem is full. In an embodiment, at decision block 310, the secondary processing subsystem 206 may determine whether the second memory subsystem is full in order to determine whether the event information generated in response to detecting the event at decision block 308 may be stored in that memory subsystem 206a. As would be appreciated by one of skill in the art in possession of the present disclosure, the memory subsystem 206a may be limited in the amount of data it may store, and due to the secondary processing subsystem code 214 being copied in the memory subsystem 206a, only a relatively small amount of the memory subsystem 206a may be available to store any event information generated in response to detecting the event at decision block 308. As discussed above, the event memory block 206b provided in the memory subsystem 206a may be a portion of the memory subsystem 206a that is designated for event information, and/or may be a remaining portion of the memory subsystem 206a not utilize for the secondary processing subsystem code 214 and/or its execution. Thus, the secondary processing subsystem 206 may compare the size of the event memory block 206b to the size of the event information generated in response to detecting the event at decision block 308 (and/or the size of that event information if that event information is compressed) to determine whether there is enough available memory space in the event memory block 206b to store the event information.

If, at decision block 310, it is determined that the second memory subsystem has available memory for storing the event information generated in response to detecting the event at decision block 308, the method 300 proceeds to block 312 where that event information is stored in the second memory subsystem. In an embodiment, at decision block 310, the secondary processing subsystem 206 may have determined that the memory subsystem 206a was not full, or that the event memory block 206b provided in the memory subsystem 206a otherwise has enough available memory to store the event information generated in response to detecting the event at decision block 308 and, in response, may store the event information (e.g., event information 402) in the event memory block 206b provided by the memory subsystem 206a at block 312, as illustrated in FIG. 4A. In different embodiments, the event information 402 may be the event information that was generated in response to detecting the event in decision block 308, or a compressed version of the event information that was generated in response to detecting the event in decision block 308. For example, the secondary processing subsystem 206 may be configured to compress the event information using a compression algorithm such as, for example, LZ4, LZ77, and/or other compression algorithms that would be apparent to one of skill in the art in possession of the present disclosure. The method 300 may then return to block 304. As such, the method 300 may loop through blocks 304, 306 308, 310, and 312 to detect events that occur during the execution of the early boot instructions, and store associated event information in the second memory subsystem as long as the second memory subsystem has sufficient available memory to do so.

Referring back to decision block 310, if at decision block 310 it is determined that the second memory subsystem is full, the method 300 proceeds to decision block 314 where it is determined whether other memory is available. In an embodiment, at decision block 314, the secondary processing subsystem may determine whether any memory other than the memory subsystem 206a is available to store the event information generated in response to detecting the event at decision block 308'. For example, the memory subsystem 206a may be filled with event information 402, and the secondary processing subsystem 206 may generate event information 404 as discussed below with respect to FIGS. 4B-4E. In such an example, depending on where the secondary processing subsystem 206 is in the execution of the secondary processing subsystem code 414, various memory subsystems may be discovered and available.

For example, as discussed above, the secondary processing subsystem 206 retrieves the secondary processing subsystem code 214 from the SRI memory subsystem 210 relatively early in the boot operations and, as such, the SRI memory subsystem 210 is one of the first memory subsystems in the computing device 200 to become available. Furthermore, the remote access controller memory subsystem 222b may be operational before the boot operations for the computing device 200 even begin. However, side-band signals provided via the RAC interface 224 to the remote access controller 222 may require initialization before the processing system 204 can access the remote access controller 222 and, as such, the RAC memory subsystem 222b may be available after the SRI memory subsystem 210. Further still, the host memory subsystem 218 may be one of the last memory subsystems in the computing device 200 to be discovered and initialized during the execution of the secondary processing subsystem code 214. Yet further still, one of skill in the art in possession of the present disclosure will recognize that portions of each memory subsystem in the computing device 200 may be become available during the execution of the secondary processing subsystem code 214 and, as such, if a portion of a memory subsystem becomes available and is large enough to store the event information, then that portion of that memory subsystem may be considered as one of the memory subsystems that are available at decision block 314.

Figure 4B:
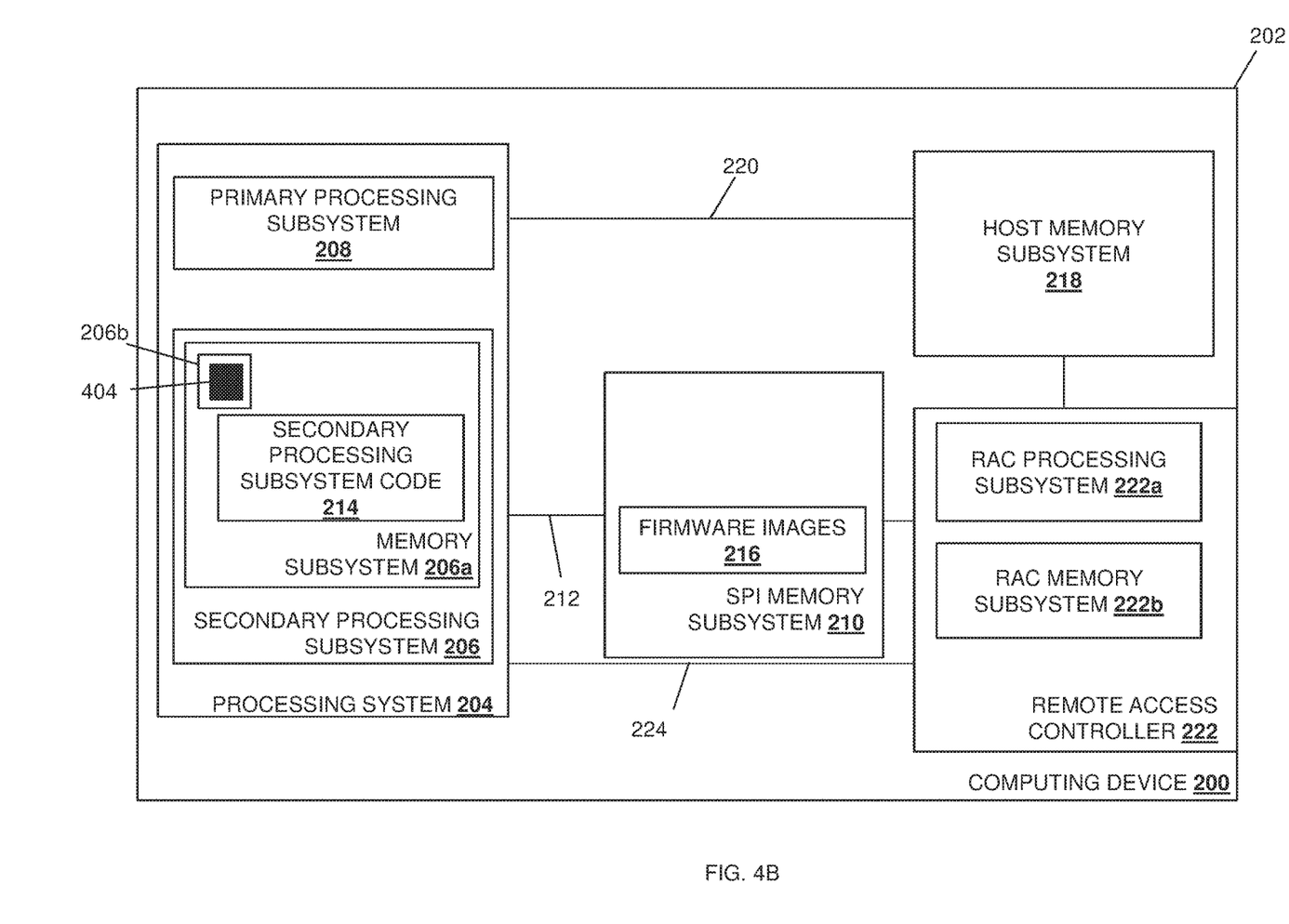
FIG. 4B is a schematic view illustrating an embodiment of the operations of the early boot event logging system in the computing device of FIG. 2 during the method of FIG. 3.

If, at decision block 314, it is determined that there is no other memory available, the method 300 proceeds to block 312 where the event information is stored in the secondary memory subsystem. In an embodiment of block 312, the secondary processing subsystem 206 may be configured to overwrite the event information that is currently stored in the memory subsystem 206a with new event information that has more recently been generated in order to store that new event information at the expense of the previously stored/older event information. As would be appreciated by one of skill in the art in possession of the present disclosure, such overwriting operations ensure that the most recent event information, which is likely to be the most useful event information to a user or other administrator, may be made available in a limited memory availability situation. As illustrated in FIG. 4B, the secondary processing subsystem 206 has overwritten the event information 402 that was originally stored in the event memory block 206b of the memory subsystem 206a with the event information 404.

If, at decision block 314, it is determined that other memory is available, the method 300 may proceed to block 316 where the event information is stored in one of the available memory subsystems based on preference. In an embodiment, at block 316, the secondary processing subsystem 206 may determine which of the available memory subsystems (e.g., the memory subsystem 206a, the SRI memory subsystem 210, the host memory subsystem 218, and/or the remote access controller memory subsystem 222b) to use for storing the event information 404. In some embodiments, each of the memory subsystems may be given a predefined preference, as each memory subsystem may have its own drawbacks and advantages when compared to other memory subsystems, and a user or administrator may set preferences for those memory subsystems based on any of those drawbacks and/or advantages. For example, while the memory subsystem 206a is relatively small (e.g., the event memory block 206b may be 64 KB or smaller as discussed above), it provides for the relatively fast storing and retrieving of the event information discussed above. Furthermore, the SRI memory subsystem 210 is relatively larger than the memory subsystem 206a (e.g., it may include approximately 8 MB of unused space), but writing and retrieving event information in the SRI memory subsystem 210 is relatively slow compared with the memory subsystem 206a. Similarly, the remote access controller memory subsystem 222b is relatively larger than the memory subsystem 206a and writing and retrieving event information is relatively slow compared with the memory subsystem 206a. However, the remote access controller memory subsystem 222b may be used to access the event information through a remote out-of-band connection, allowing an administrator to access the event information remotely in situations where the early boot operations fail to boot the primary processing subsystem 208/computing device 200. Further still, the host memory subsystem 218 may provide the greatest amount of memory space to store event information, may be faster than the remote access controller memory subsystem 222b and/or the SRI memory subsystem, and may be easier for the primary processing subsystem 208 to access than the SRI memory subsystem 210 and/or the remote access controller memory subsystem 222b. Furthermore, certain portions of the host memory subsystem 218 may be more preferable over other portions. For example, in a host memory subsystem 218 that includes 8 GB of storage, the memory below 4 GB can be accessed without much setup effort (in 32-bit mode), while the memory above 4 GB requires the computer system 200 to be in 64-bit mode.

Thus, in various embodiments, the memory subsystem 206a may be the preferred memory subsystems included in the available memory subsystems and, as discussed above with reference to FIG. 4B, the secondary processing subsystem 206 may overwrite the event information 402 with the event information 404 when necessary. As would be understood by one of skill in the art in possession of the present disclosure, while the memory subsystem 206a may not be the most preferred memory subsystem (e.g., the host memory subsystem 218 may be the most preferred memory subsystem based on its advantages discussed above), the most preferred memory subsystem may not be available at the time when the writing of the event information is necessary, and thus the memory subsystem 206a may be the most preferred available memory subsystem in which to store the event information 404.

Figure 4C:
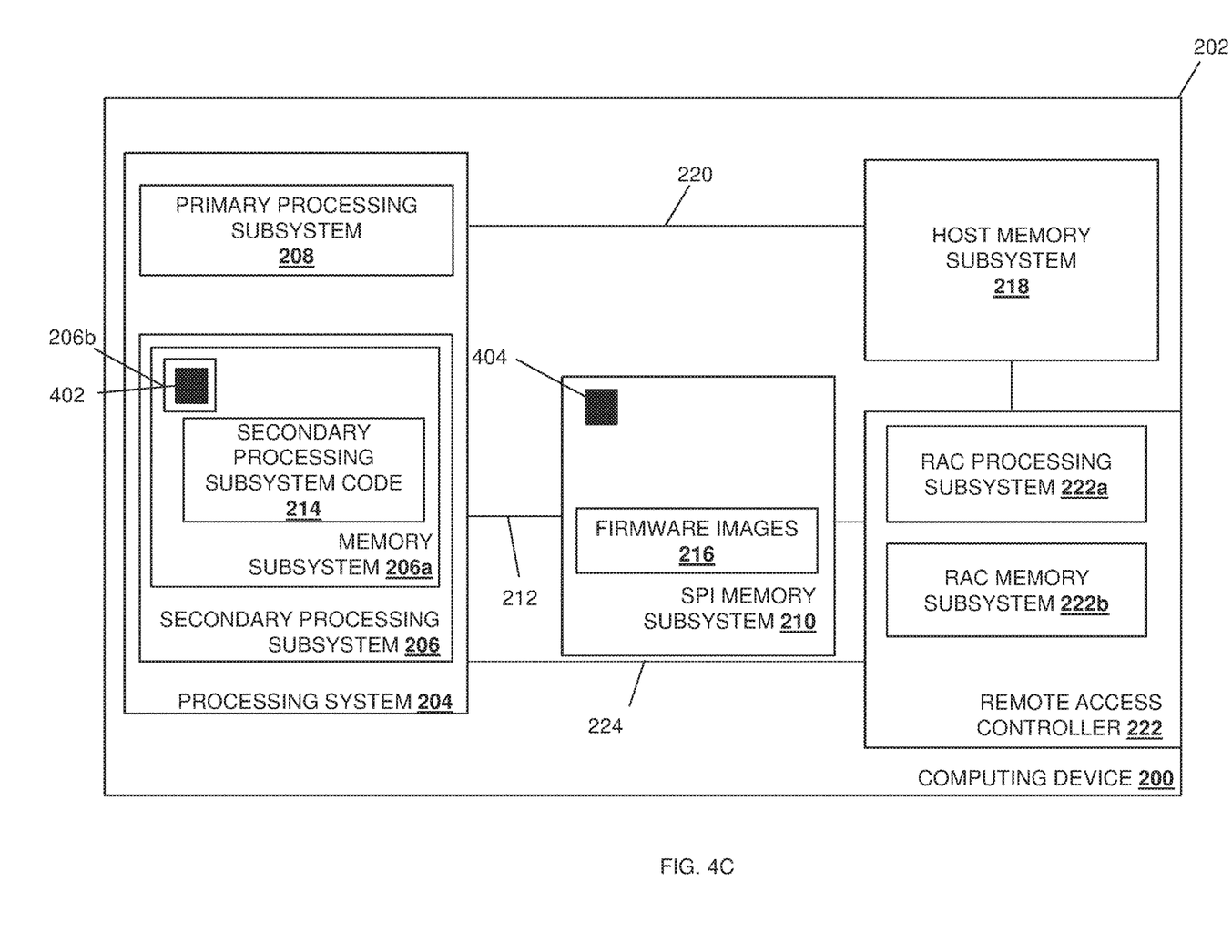
FIG. 4C is a schematic view illustrating an embodiment of the operations of the early boot event logging system in the computing device of FIG. 2 during the method of FIG. 3.
Figure 4D:
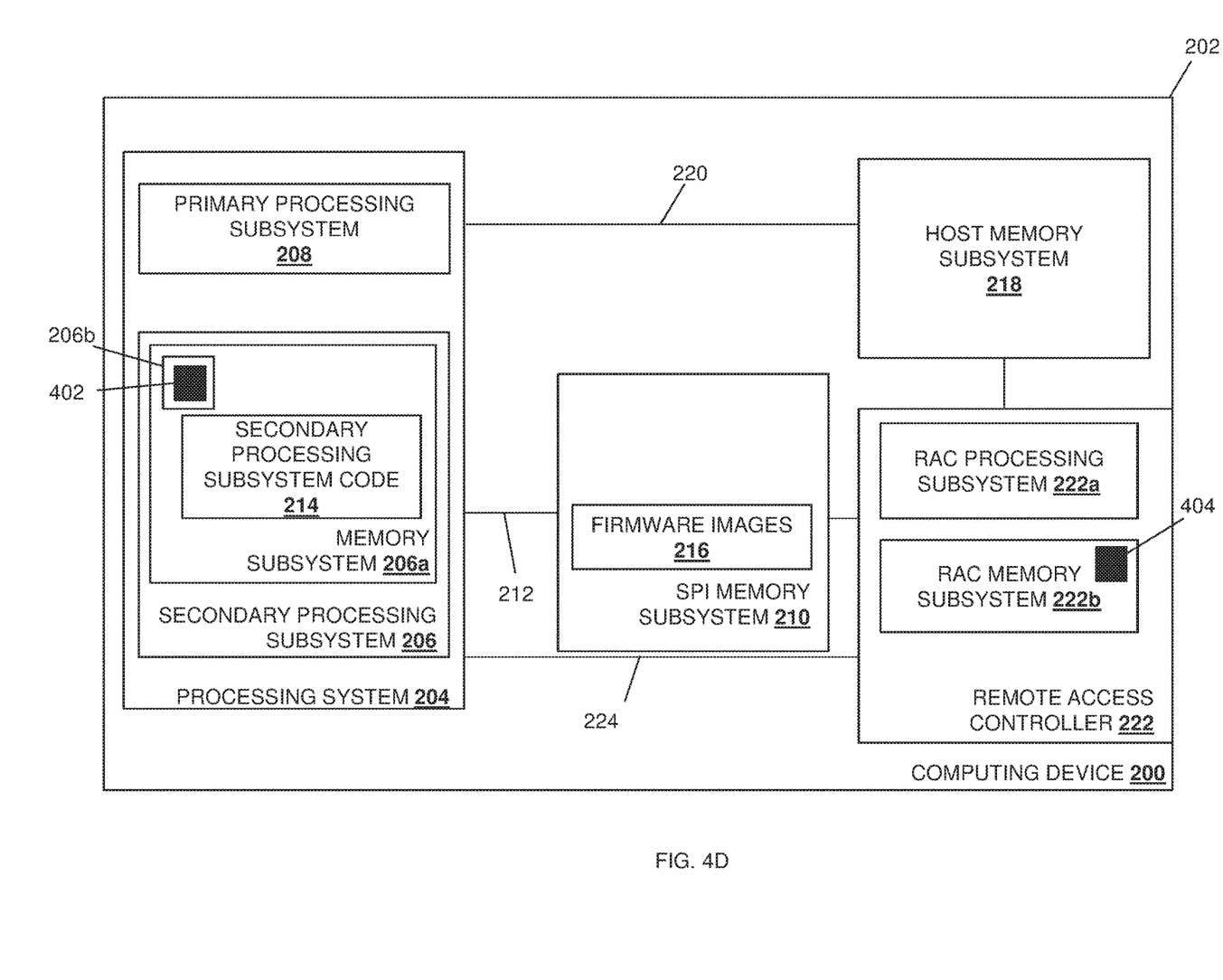
FIG. 4D is a schematic view illustrating an embodiment of the operations of the early boot event logging system in the computing device of FIG. 2 during the method of FIG. 3.

FIG. 4C provides an example of when the most preferred memory subsystem included in the available memory subsystems is the SRI memory subsystem 210. As such, the secondary processing subsystem 206 may write the event information 404 to the SRI memory subsystem 210 via the SRI interface 212, which allows the event information 402 to remain in the event memory block 206b provided in the memory subsystem 206a. FIG. 4D provides an example of when the most preferred memory subsystem included in the available memory subsystems is the remote access controller memory subsystem 222b. As such, the secondary processing subsystem 206 may provide the event information 404 via the RAC interface 224 to the remote access controller 222 for storage in the RAC memory subsystem 222b, which allows the event information 402 to remain in the event memory block 206b provided in the memory subsystem 206a.

Figure 4E:
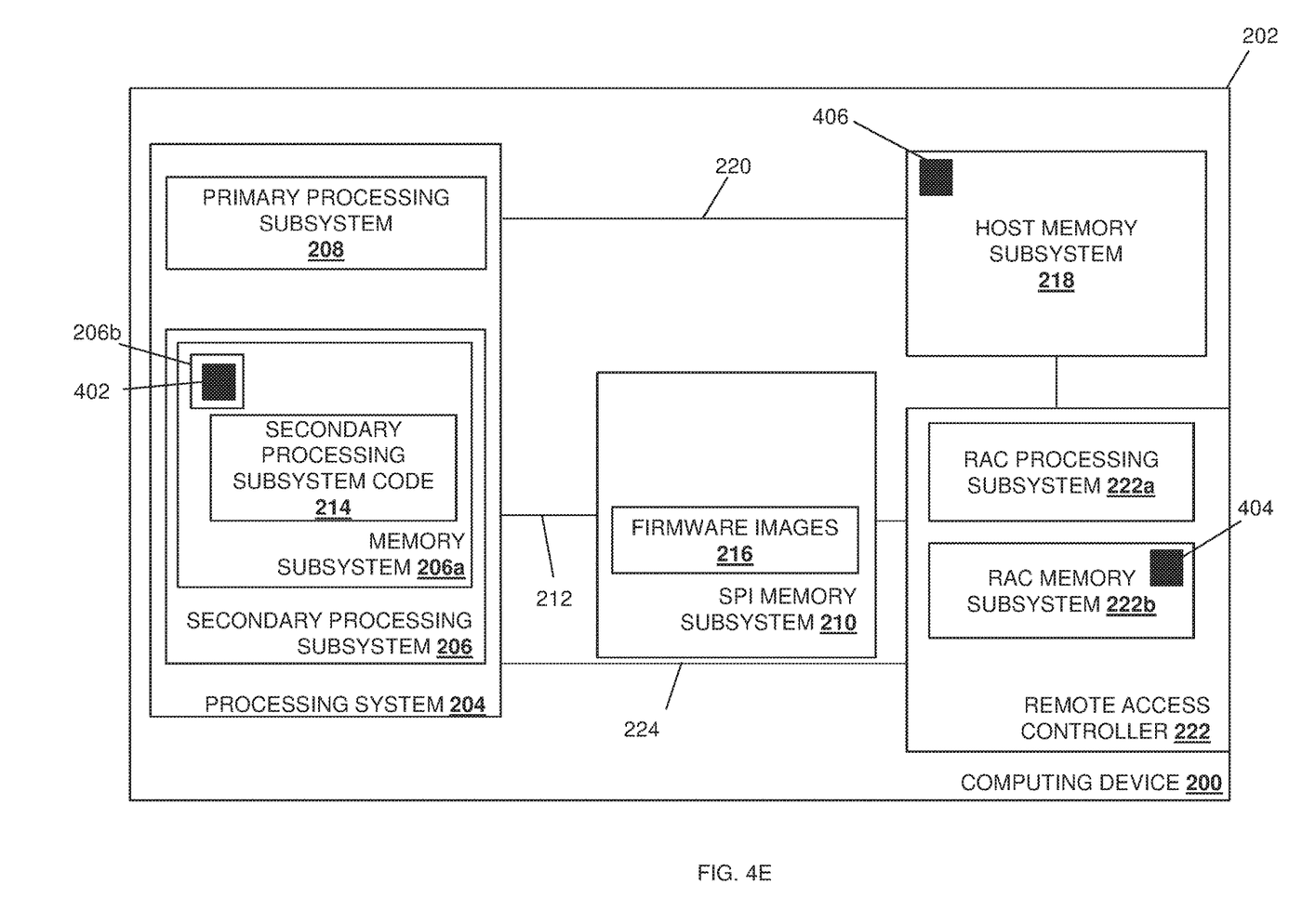
FIG. 4E is a schematic view illustrating an embodiment of the operations of the early boot event logging system in the computing device of FIG. 2 during the method of FIG. 3.

FIG. 4E provides an example of when the most preferred memory subsystem included in the available memory subsystems is the host memory subsystem 218. As such, the secondary processing subsystem 206 may store event information 406 in the host memory subsystem 218 via the host memory interface 220. For example, in the embodiment illustrated in FIG. 4E and prior to the host memory subsystem 218 being available, the RAC memory subsystem 222b may have been the most preferred memory subsystem that was available when the event information 404 was generated. As such, the event information 404 may have been stored in the RAC memory subsystem 222b, and the event information 402 may remain in the event memory block 206b provided in the memory subsystem 206a. In various embodiments and similarly as discussed above for the event information 402, the event information 404 and/or the event information 406 may be compressed by the secondary processing subsystem 206 before writing that event information to any of the memory subsystems. The method 300 may then return to block 304.

If, at decision block 306, it is determined that the execution of the early boot instructions has completed, the method 300 proceeds to block 318 where pointer(s) to memory address(es) storing event information are provided to the primary processing system, and control of the boot operations is passed to the primary processing system. In an embodiment, at block 318, the secondary processing subsystem 206 may complete the execution of the early boot instructions, which includes initializing the primary processing subsystem 208 and may include verifying the boot instructions that will be used by the primary processing subsystem 208 to complete the boot operation. As such, the secondary processing subsystem provides control of the boot operations to the primary processing subsystem 208, which results in the primary processing subsystem 208 executing the primary boot instructions to perform the BIOS processes that result in the loading of an operating system and/or other boot operations that would be apparent to one of skill in the art in possession of the present disclosure. Along with passing control of the boot operations to the primary processing subsystem 208, the secondary processing subsystem 206 may provide to the primary processing subsystem 208 a pointer to each memory address in which event information was stored during the method 300. As such, when requested by an administrator (e.g., via a graphical user interface or a command line interface), the primary processing subsystem 208 may access the event information using the identified memory addresses, and provide the event information for display to the administrator via a display system. In other embodiments, the remote access controller 222 may obtain the memory address pointers from the primary processing subsystem 208 such that the administrator may remotely access the event information for events that occurred prior to the primary processing subsystem 208 being initialized. In yet other examples, the event information may be accessed through the BIOS (by booting to UEFI shell and running UEFI utility.

Thus, systems and methods have been described that provide for early boot event logging in a computing device. A secondary processing subsystem, which performs a portion of boot operations for the computing device prior to a primary processing subsystem being initialized, may detect events and generate event information based on those events. The secondary processing subsystem may store the event information in a memory subsystem (e.g., a PSP RAM) associated with the secondary processing subsystem, and once that memory subsystem is full, the secondary processing subsystem may determine whether any other memory subsystems are available to store additional event information that is generated as long as the secondary processing subsystem is in control of the boot operations. If other memory subsystems are available, the secondary processing subsystem may store the additional event information in those available memory subsystems based on predefined preference(s). As such, the event information may be viewed by an administrator on-demand (e.g., when the event information is request), rather than needing to stream serialized messages that contain event information on-demand (e.g., when the option to stream serialized messages is selected), as may be performed in conventional systems. Thus, the systems and methods of the present disclosure reduce boot times, permit access to the event information early in the boot process, and may be used to more easily detect intermittent events that occur prior to the primary processing subsystem controlling the boot operations of the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An early boot debug system, comprising:
a host memory subsystem;
a first memory subsystem that includes boot instructions; and
a processing system that is coupled to the host memory system and the first memory subsystem and that includes:
a primary processing subsystem; and
a secondary processing subsystem that is coupled to the primary processing subsystem, the host memory system, and the first memory subsystem, that includes a second memory subsystem, and that is configured to:
copy the boot instructions from the first memory subsystem to the second memory subsystem;
begin a boot process by executing the boot instructions from the second memory subsystem to perform early boot operations that, when completed, initialize the primary processing subsystem such that primary processing subsystem takes control of the boot process and performs subsequent boot operations to complete the boot process;
detect a first event during the execution of the boot instructions to perform the early boot operations and, in response, generate first event information;
store the first event information in the second memory subsystem;
detect a second event during the execution of the boot instructions and, in response, generate a second event information;
determine the second memory subsystem is full;
determine that the execution of the boot instructions has initialized at least an initialized portion of the host memory subsystem; and
store the second event information in the initialized portion of the host memory subsystem.

2. The system of claim 1, wherein the secondary processing subsystem is configured to:
determine that the second memory subsystem is full; and
overwrite third event information that was previously stored in the second memory subsystem with the first event information.

3. The system of claim 1, wherein the secondary processing subsystem is configured to:
determine the first event information is larger than an available space in the second memory subsystem; and
compress the first event information prior to the storing the first event information in the second memory subsystem.

4. The system of claim 1, wherein the secondary processing subsystem is configured to:
detect a third event during the execution of the boot instructions and, in response, generate third event information; and
determine the second memory subsystem is full and, in response, store the third event information in the first memory subsystem.

5. The system of claim 1, wherein the secondary processing subsystem is configured to:
provide, to the primary processing subsystem when the early boot operations have completed, a pointer to a memory location of the first event information in the second memory subsystem; and
pass control to the primary processing subsystem, wherein the primary processing subsystem is configured to:
receive a request to display the first event information;
retrieve, using the pointer, the first event information from the memory location; and
provide the first event information for display on a display device coupled to the processing system.

6. An early boot debug system, comprising:
a first memory subsystem that includes boot instructions;
a remote access controller that includes a third memory subsystem; and a processing system that is coupled to the first memory subsystem and the third memory subsystem and that includes:
a primary processing subsystem; and
a secondary processing subsystem that is coupled to the primary processing subsystem, the third memory subsystem, and the first memory subsystem, that includes a second memory subsystem, and that is configured to:
copy the boot instructions from the first memory subsystem to the second memory subsystem;
begin a boot process by executing the boot instructions from the second memory subsystem to perform early boot operations that, when completed, initialize the primary processing subsystem such that primary processing subsystem takes control of the boot process and performs subsequent boot operations to complete the boot process;
detect a first event during the execution of the boot instructions to perform the early boot operations and, in response, generate first event information;
store the first event information in the second memory subsystem;
detect a second event during the execution of the boot instructions and, in response, generate second event information;
determine the second memory subsystem is full;
determine that the execution of the boot instructions has advanced such that the remote access controller is accessible by the secondary processing subsystem; and
store, in response to the determining the second memory subsystem is full and the remote access controller is accessible by the secondary processing subsystem, the second event information in the third memory subsystem.

7. An Information Handling System (IHS), comprising:
a host memory subsystem; and
a processing system that is coupled to the host memory subsystem and that includes a primary processing subsystem and a secondary processing subsystem, wherein the secondary processing subsystem is configured to:
copy boot instructions that are stored in a first memory subsystem to a second memory subsystem that is included in the secondary processing subsystem;
begin a boot process by executing the boot instructions from the second memory subsystem to perform early boot operations that, when completed, initialize the primary processing subsystem such that the primary processing system takes control of the boot process and performs subsequent boot operations to complete the boot process;
detect a first event during the execution of the boot instructions to perform the early boot operations and, in response, generate first event information; and
store the first event information in the second memory subsystem;
detect a second event during the execution of the boot instructions and, in response, generate a second event information;
determine the second memory subsystem is full;
determine that the execution of the boot instructions has initialized at least an initialized portion of the host memory subsystem; and
store the second event information in the initialized portion of the host memory subsystem.

8. The IHS of claim 7, wherein the secondary processing subsystem is configured to:
determine that the second memory subsystem is full, wherein the storing the first event information in the second memory subsystem includes overwriting third event information that was previously stored in the second memory subsystem with the first event information.

9. The IHS of claim 7, wherein the secondary processing subsystem is configured to:
determine the first event information is larger than an available space in the second memory subsystem; and
compress the first event information prior to the storing the first event information in the second memory subsystem.

10. The IHS of claim 7, wherein the secondary processing subsystem is configured to:
detect a third event during the execution of the boot instructions and, in response, generate third event information; and
determine the second memory subsystem is full and, in response, store the third event information in the first memory subsystem.

11. The IHS of claim 7, wherein the secondary processing subsystem is configured to:
provide, to the primary processing subsystem when the early boot operations have completed, a pointer to a memory location of the first event information in the second memory subsystem; and
pass control to the primary processing subsystem, wherein the primary processing subsystem is configured to:
receive a request to display the first event information;
retrieve, using the pointer to the memory location, the first event information from the memory location; and
provide the first event information for display on a display device coupled to the processing system.

12. An Information Handling System (IHS), comprising:
a host memory subsystem;
a remote access controller that includes a third memory subsystem; and
a processing system that is coupled to the host memory subsystem and the remote access controller, and that includes a primary processing subsystem and a secondary processing subsystem, wherein the secondary processing subsystem is configured to:
copy boot instructions that are stored in a first memory subsystem to a second memory subsystem that is included in the secondary processing subsystem;
begin a boot process by executing the boot instructions from the second memory subsystem to perform early boot operations that, when completed, initialize the primary processing subsystem such that the primary processing system takes control of the boot process and performs subsequent boot operations to complete the boot process;
detect a first event during the execution of the boot instructions to perform the early boot operations and, in response, generate first event information;
store the first event information in the second memory subsystem;
detect a second event during the execution of the boot instructions and, in response, generate second event information;
determine the second memory subsystem is full;

determine that the execution of the boot instructions has advanced such that the remote access controller is accessible by the secondary processing subsystem; and store, in response to the determining the second memory subsystem is full and the remote access controller is accessible by the secondary processing subsystem, the second event information in the third memory subsystem.

13. A method for logging early boot events in a computing device, comprising:

copying, by a secondary processing subsystem that is included in a processing system with a primary processing subsystem, boot instructions that are stored in a first memory subsystem to a second memory subsystem that is included in the secondary processing subsystem;

beginning, by the secondary processing subsystem, a boot process by executing the boot instructions from the second memory subsystem to perform early boot operations that, when completed, initialize the primary processing subsystem such that the primary processing system takes control of the boot process and performs subsequent boot operations to complete the boot process;

detecting, by the secondary processing subsystem, a first event during the execution of the boot instructions to perform the early boot operations and, in response, generating first event information;

storing, by the secondary processing subsystem, the first event information in the second memory subsystem;

detecting, by the secondary processing subsystem, a second event during the execution of the boot instructions and, in response, generating second event information;

determining, by the secondary processing subsystem, the second memory subsystem is full;

determining, by the secondary processing subsystem, that the execution of the boot instructions has initialized at least an initialized portion of the host memory subsystem; and storing, by the secondary processing subsystem, the second event information in the initialized portion of the host memory subsystem.

14. The method of claim 13, further comprising:

determining, by the secondary processing subsystem, that the second memory subsystem is full, wherein the storing the first event information in the second memory subsystem includes overwriting third event information that was previously stored in the second memory subsystem with the first event information.

15. The method of claim 13, further comprising:

detecting, by the secondary processing subsystem, a third event during the execution of the boot instructions and, in response, generating third event information; and determining, by the secondary processing subsystem, the second memory subsystem is full and, in response, storing the third event information in the first memory subsystem.

16. The method of claim 13, further comprising:

providing, by the secondary processing subsystem to the primary processing subsystem when the early boot operations have completed, a pointer to a memory location of the first event information in the second memory subsystem; and passing, by the secondary processing subsystem, control to the primary processing subsystem;

receiving, by the primary processing subsystem, a request to display the first event information;

retrieving, by the primary processing subsystem using the pointer to the memory location, the first event information from the memory location; and providing, by the primary processing subsystem the first event information for display on a display device coupled to the processing system.

17. A method for logging early boot events in a computing device, comprising:

copying, by a secondary processing subsystem that is included in a processing system with a primary processing subsystem, boot instructions that are stored in a first memory subsystem to a second memory subsystem that is included in the secondary processing subsystem;

beginning, by the secondary processing subsystem, a boot process by executing the boot instructions from the second memory subsystem to perform early boot operations that, when completed, initialize the primary processing subsystem such that the primary processing system takes control of the boot process and performs subsequent boot operations to complete the boot process;

detecting, by the secondary processing subsystem, a first event during the execution of the boot instructions to perform the early boot operations and, in response, generating first event information;

storing, by the secondary processing subsystem, the first event information in the second memory subsystem;

detecting, by the secondary processing subsystem, a second event during the execution of the boot instructions and, in response, generating second event information;

determining, by the secondary processing subsystem, the second memory subsystem is full; and determining, by the secondary processing subsystem, that the execution of the boot instructions has advanced such that a remote access controller is accessible by the secondary processing subsystem; and storing, by the secondary processing subsystem in response to the determining the second memory subsystem is full and the remote access controller is accessible by the secondary processing subsystem, the second event information in a third memory subsystem in the remote access controller.

\* \* \* \* \*

UNITED STATES PATENT AND TRADEMARK OFFICE
CERTIFICATE OF CORRECTION

PATENT NO. : 11,550,664 B2  
APPLICATION NO. : 16/378023  
DATED : January 10, 2023  
INVENTOR(S) : Luong et al.

Page 1 of 1

It is certified that error appears in the above-identified patent and that said Letters Patent is hereby corrected as shown below:

In the Specification

Column 5, Line 29, "SRI memory subsystem" should read --SPI memory subsystem--  
Column 6, Line 17, "SRI memory subsystem" should read --SPI memory subsystem--  
Column 7, Line 13, "SRI memory subsystem" should read --SPI memory subsystem--  
Column 7, Lines 44-45, "SRI memory subsystem" should read --SPI memory subsystem--  
Column 7, Lines 45-46, "SRI interface", each occurrence, should read --SPI interface--  
Column 7, Lines 50-51, "SRI memory subsystem" should read --SPI memory subsystem--  
Column 7, Line 51, "SRI interface", each occurrence, should read --SPI interface--  
Column 10, Line 37, "SRI memory subsystem" should read --SPI memory subsystem--  
Column 10, Lines 38-39, "SRI memory subsystem" should read --SPI memory subsystem--  
Column 10, Line 48, "SRI memory subsystem" should read --SPI memory subsystem--  
Column 11, Lines 20-21, "SRI memory subsystem" should read --SPI memory subsystem--  
Column 11, Line 34, "SRI memory subsystem" should read --SPI memory subsystem--  
Column 11, Line 37, "SRI memory subsystem" should read --SPI memory subsystem--  
Column 11, Line 52, "SRI memory subsystem" should read --SPI memory subsystem--  
Column 11, Lines 53-54, "SRI memory subsystem" should read --SPI memory subsystem--  
Column 12, Line 13, "SRI memory subsystem" should read --SPI memory subsystem--  
Column 12, Line 15, "SRI memory subsystem" should read --SPI memory subsystem--  
Column 12, Line 16, "SRI interface" should read --SPI interface--

In the Claims

Claim 7, Column 15, Line 56, "in response, generate first event information; and" should read --in response, generate first event information;--

Signed and Sealed this  
Eighteenth Day of April, 2023

Katherine Kelly Vidal  
*Director of the United States Patent and Trademark Office*